US012749310B1

(12) United States Patent
Wang et al.

(10) Patent No.: US 12,749,310 B1
(45) Date of Patent: Sep. 29, 2026

(54) MERGING TOKENS FOR LONG-FORM VIDEO UNDERSTANDING

(71) Applicant: Amazon Technologies, Inc., Seattle, WA (US)

(72) Inventors: Jue Wang, Sammamish, WA (US); David Jiatian Fan, New York, NY (US); Xinyu Li, Sammamish, WA (US); Zhikang Zhang, Bellevue, WA (US); Seon-Ho Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 18/818,223

(22) Filed: Aug. 28, 2024

(51) Int. Cl.
*G06V 20/40* (2022.01)
*G06V 10/26* (2022.01)
*G06V 10/74* (2022.01)
*G06V 10/82* (2022.01)

(52) U.S. Cl.
CPC .............. *G06V 20/41* (2022.01); *G06V 10/26* (2022.01); *G06V 10/761* (2022.01); *G06V 10/82* (2022.01); *G06V 20/46* (2022.01)

(58) Field of Classification Search
CPC ...... G06V 20/41; G06V 10/26; G06V 10/761; G06V 10/82; G06V 20/46
See application file for complete search history.

(56) References Cited

U.S. PATENT DOCUMENTS

2015/0139557 A1* 5/2015 Lin ........................ G06V 10/50 382/220
2023/0334791 A1* 10/2023 Etwaru ................... G06F 3/165
2024/0185605 A1* 6/2024 Jones ................... G06V 10/759

FOREIGN PATENT DOCUMENTS

CN 116403294 * 7/2023
GB 2609708 * 2/2023

OTHER PUBLICATIONS

Machine translation for CN 116403294 (Year: 2023).*
Gao et al., "Patch-Set-Based Representation for Alignment-Free Image Set Classification", IEEE Transactions on Circuits and Systems for Video Technology ( vol. 26, Issue: 9, Sep. 2016) (Year: 2016).*
Gunsel et al. "Temporal video segmentation using unsupervised clustering and semantic object tracking", Journal of Electronic Imaging 7(3), 592+604 (Jul. 1998). (Year: 1998).*
Cooper et al., "Video Segmentation via Temporal Pattern Classification", IEEE Transactions on Multimedia, vol. 9, No. 3, Apr. 2007 (Year: 2007).*

(Continued)

*Primary Examiner* — Qian Yang
(74) *Attorney, Agent, or Firm* — Athorus, PLLC

(57) ABSTRACT

Tokens or patches are divided from individual images of long-form video files and merged by transformer models, for the purposes of classifying such video files. Tokens or patches may have any dimensions, and may be partitioned from images of a video file into target tokens and source tokens in any manner, e.g., uniformly, based on their respective locations within the individual images, based on any motion of the respective tokens, or by a learned model that partitions the tokens based on scores representative of their saliency using one or more blocks of a transformer model. Once the tokens are partitioned, source tokens are matched with target tokens, and merged tokens identified from the matched tokens are processed to classify the video file.

20 Claims, 13 Drawing Sheets

(56) References Cited

OTHER PUBLICATIONS

Hou, W., et al. "Towards Long Form Audio-Visual Video Understanding," ACM Transactions on Multimedia Computing, Communications and Applications, Jun. 7, 2024, available at https://dl.acm.org/doi/abs/10.1145/3672079, 22 pages.

* cited by examiner

NAIVE TARGET TOKEN SELECTION

REGION-CONCENTRATED TARGET TOKEN SELECTION

MOTION-BASED TARGET TOKEN SELECTION

MERGING TOKENS FOR LONG-FORM VIDEO UNDERSTANDING

BACKGROUND

Transformers are a type of an artificial neural network architecture that transforms or changes input sequences into output sequences. Transformers operate by learning contexts and tracking relationships between sequence components, and by processing long sequences in their entirety with parallel computation, which significantly decreases both training and processing times. A transformer model may be initially trained on large datasets and subsequently fine-tuned based on smaller, task-specific datasets or complex datasets. While traditional artificial neural networks process input sequences of data using encoders that read and process the input sequences in series, and transform such sequences into compact representations, before decoding the representations into output sequences, a transformer model utilizes components such as self-attention mechanisms to evaluate an entire sequence of data at once and identify portions of the sequence of data that are most relevant or important.

In recent times, artificial neural networks having transformer architectures have been increasingly utilized in applications such as natural language processing (or "NLP") or natural language understanding (or "NLU"), and more recently in computer vision and other image processing applications. Unlike language applications, however, image-based inputs to transformers have substantially lower information densities. For this reason, tokenizing raw visual images, e.g., "RGB" images, as non-overlapping patches is an essential operation when using transformers in imaging applications. However, the computational cost of using transformers in imaging applications increases exponentially with the length of input sequences, which may require an extremely large number of computations to be executed when visual images are provided as inputs to a large-scale transformer model having billions of parameters.

Moreover, many video files include visual images with portions of pixels that are repeated from image frame to image frame, or are otherwise redundant, both spatially and temporally. Therefore, when such video files are provided as inputs to a transformer model, and subject to processing, many of the computations that are performed to process the video files are unnecessarily duplicated. Previously, some efforts to improve the efficiency of transformer models have focused on enhanced selection processes such as input sampling or token dropping, e.g., to identify or select more useful or valuable tokens or to avoid or drop less useful or less valuable tokens. Such techniques may result in information loss, however, as a token that is dropped or otherwise not selected is unavailable for use by later layers of a transformer model.

DETAILED DESCRIPTION

As is set forth in greater detail below, the present disclosure is directed to systems and methods for merging video tokens for long-form video understanding. More specifically, the systems and methods of the present disclosure are directed to techniques for merging tokens for long-form video understanding that rely not only on similarity but also saliency when partitioning, matching and merging tokens of a video file when classifying the video file.

A video file that is to be classified may include any number of individual images that may be extracted from the video file and divided into tokens. Such tokens may have any dimensions with respect to the individual images from which the tokens were divided, and may be partitioned into one or more sets of target tokens and one or more sets of source tokens. Each of the source tokens may be matched to one of the target tokens, e.g., by cosine similarity or by one or more other techniques, and merged tokens may be identified from groups including one of the target tokens and any number of matching source tokens. The merged tokens may then be processed to generate embeddings therefrom, and the video file may be classified based on the embeddings, e.g., by providing the embeddings as inputs to a classifier trained to classify video files based on the embeddings.

In some implementations, a video file including a plurality of individual images is provided as inputs to an encoder, which may generate a set of tokens from each of the individual images. The tokens may be provided as inputs to a transformer model having any number of transformer blocks. The transformer blocks may include attention mechanisms for determining the relative importance of such tokens, dropout layers, token merging blocks and linear blocks. Each of the transformer blocks may be configured to partition tokens into target tokens and source tokens, to match the source tokens to target tokens, e.g., in groups, and to merge the tokens in each of such groups. The transformer blocks may partition the tokens based on their respective locations within image frames, based on any motion associated with the tokens, or based on the saliency of the respective tokens.

Figure 1A:
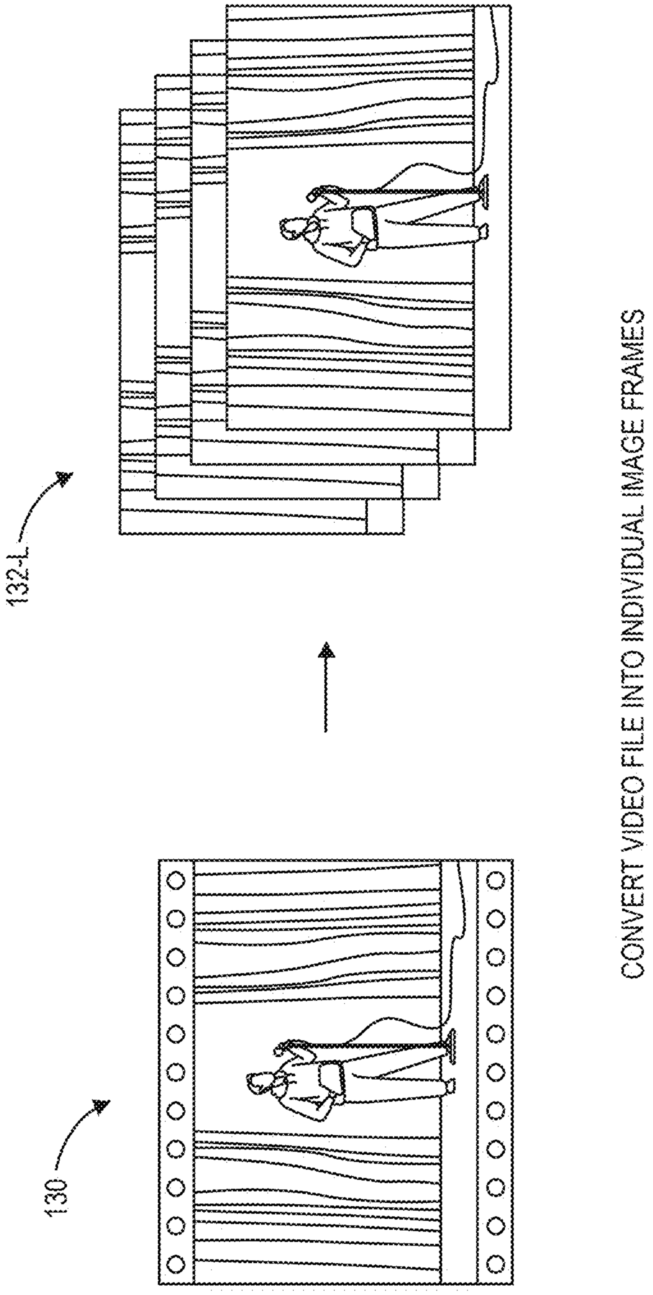
FIGS. 1A through 1D are views of aspects of one system for merging tokens in accordance with implementations of the present disclosure.

Referring to FIGS. 1A through 1D, views of aspects of one system for merging tokens in accordance with implementations of the present disclosure are shown. As is shown in FIG. 1A, a video file 130 is processed to extract a plurality of individual images 132-L therefrom. The video file 130 may include any type or form of visual content, e.g., still or moving images, and may optionally include audio content or other multimedia. For example, the video file 130 may be a documentary film, an educational video (e.g., an online instruction video, a series of lessons, a webinar), an entertainment video (e.g., a motion picture, a social media video, a television show), an informational video (e.g., an interview, a news story, a public service announcement), a promotional video (e.g., a commercial advertisement, a demonstration, a testimonial video), or any other visual content or multimedia. The video file 130 may be maintained on one or more physical computer servers or data stores (e.g., databases) that may be hosted or controlled by any entity associated with the broadcasting, airing, streaming or distribution of one or more video and audio files over networks, e.g., an online marketplace, an entertainment company, a video streaming service, a cable television provider, an operator of an over-the-air television station or channel, a social network, an outlet for news or media of any kind, or any like individual or entity.

The individual images 132-L may be extracted from the video file 130 in any manner and using any application, technique or tool. In some implementations, each of the images 132-L of the video file 130 may be extracted from the video file 130 on a frame-by-frame basis. Alternatively, in some other implementations, fewer than all of the individual images of the video file 130 may be extracted. For example, image frames may be extracted from the video file 130 at selected or periodic intervals, e.g., every n-th image frame may be extracted from the video file, or a single image frame may be extracted from the video file per every unit of time, e.g., one image frame per second.

Figure 1B:
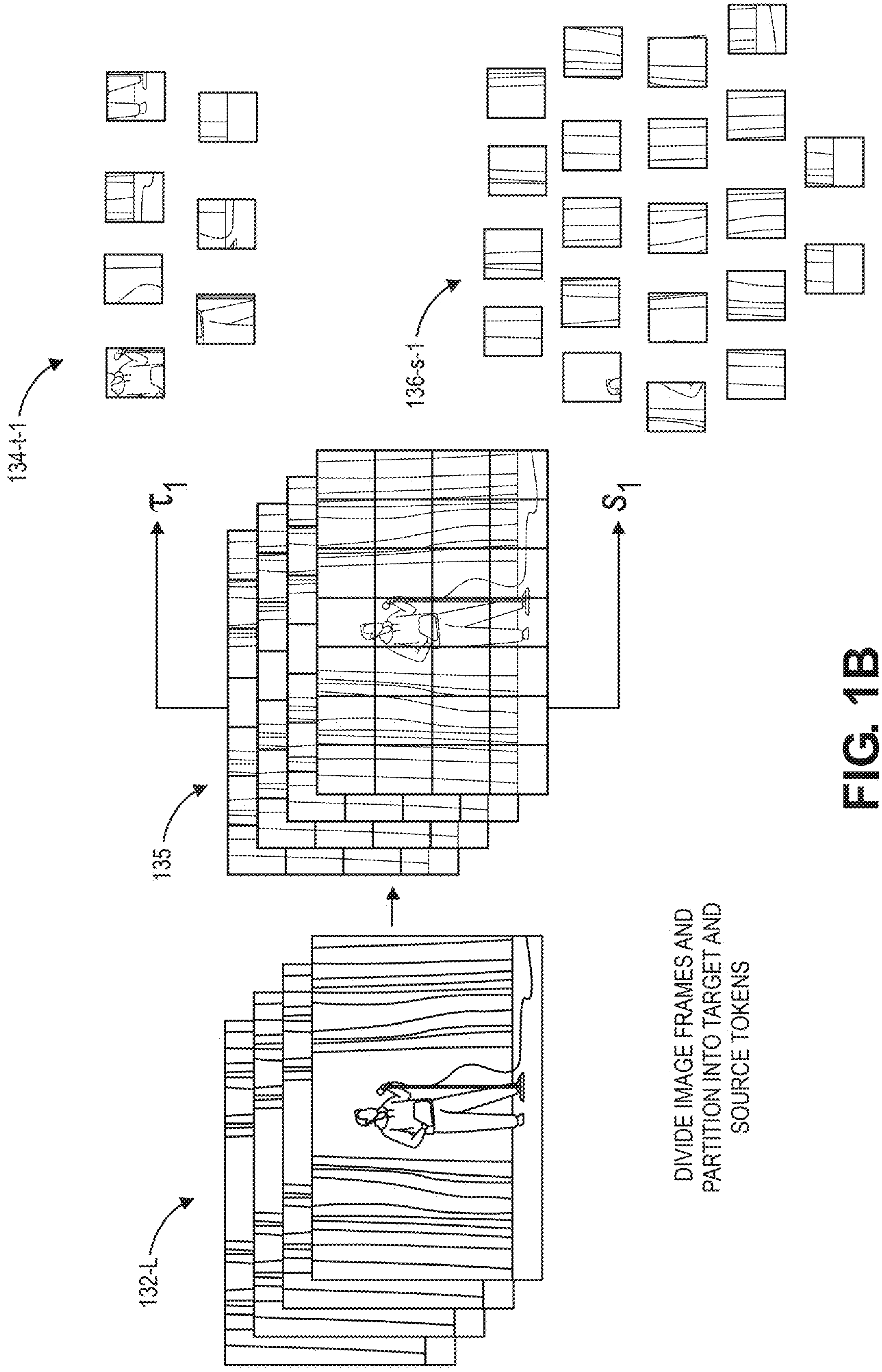

As is shown in FIG. 1B, the individual images 132-L of the video file 130 may be divided into any number of tokens (or patches) 135, in any manner and on any basis. In some implementations, each of the individual images 132-L may be divided into a grid of patches having equal sizes, such that none of the patches overlaps with one another, and each of the patches may be considered as an individual token. For example, where each of the individual images 132-L has dimensions of two hundred fifty-six pixels by two hundred fifty-six pixels, the tokens 135 may have dimensions of sixteen pixels by sixteen pixels.

As is further shown in FIG. 1B, the tokens 135 may be partitioned into a first set $\tau_1$ of target tokens 134-*t*-1 and a first set $S_1$ of source tokens 136-*s*-1. Each of the first set $\tau_1$ of target tokens 134-*t*-1 may be selected on any basis, and all of the tokens 135 may be allocated to either the first set $\tau_1$ of target tokens 134-*t*-1 or the first set $S_1$ of source tokens 136-*s*-1. For example, in some implementations, the first set $\tau_1$ of target tokens 134-*t*-1 may be selected uniformly, e.g., according to a naïve selection function, such that every one of the tokens 135 at a regular interval is added to the first set $\tau_1$ of target tokens 134-*t*-1. In some implementations, the first set $\tau_1$ of target tokens 134-*t*-1 may be selected based on their respective locations of the respective tokens within an image frame of one or more of the individual images 132-L, such as whether a token is nearest a central region of the image frame, or whether a token is nearest a boundary region of the image frame.

In some implementations, the first set $\tau_1$ of target tokens 134-*t*-1 may be selected based on observed motion of the respective ones of the tokens 135, e.g., by calculating motion vectors for each of the tokens 135, calculating sampling probabilities for the tokens 135 based on the respective motion vectors, and selecting the first set $\tau_1$ of target tokens 134-*t*-1 from the tokens 135 based on the sampling probabilities. The tokens 135 having comparatively high levels of motion (or velocity) may more likely be selected as the first set $\tau_1$ of target tokens 134-*t*-1, and the tokens 135 having comparatively low levels of motion (or velocity) being selected as the first set $S_1$ of source tokens 136-*s*-1.

In yet other implementations, the tokens 135 may be partitioned using a learnable model that determines saliency scores for one or more of the tokens 135, and selects the first set $\tau_1$ of the target tokens 134-*t*-1 based on their saliency scores. For example, in some implementations, a query, a key and a value may be obtained using learnable projection matrices of the learnable model, which may be trained by supervised learning using datasets including a plurality of image frames and portions of such image frames that are labeled based on absolute or relative saliency. Subsequently, self-attention may be performed on the query, the key and the value, and saliency scores for the tokens may be calculated for each of the tokens 135 using the key and a learnable projection matrix of the learnable model. Sampling probabilities may be calculated for the tokens 135 based on their respective saliency scores, and the first set $\tau_1$ of target tokens 134-*t*-1 may be selected from the tokens 135 based on the sampling probabilities. The tokens 135 having comparatively high levels of saliency may be more likely selected as the first set $\tau_1$ of target tokens 134-*t*-1, and the tokens 135 having comparatively low levels of saliency may be more likely selected as the first set $S_1$ of source tokens 136-*s*-1.

The tokens 135 may be partitioned in any manner and by any technique. For example, in some implementations, the tokens 135 may be provided as inputs to a transformer model having one or more transformer blocks, and the tokens 135 may be partitioned, e.g., into the first set $\tau_1$ of target tokens 134-*t*-1 and the first set $S_1$ of source tokens 136-*s*-1, by a first one of the plurality of transformer blocks. Alternatively, the tokens 135 may be partitioned in any other manner and by any other technique.

Figure 1C:
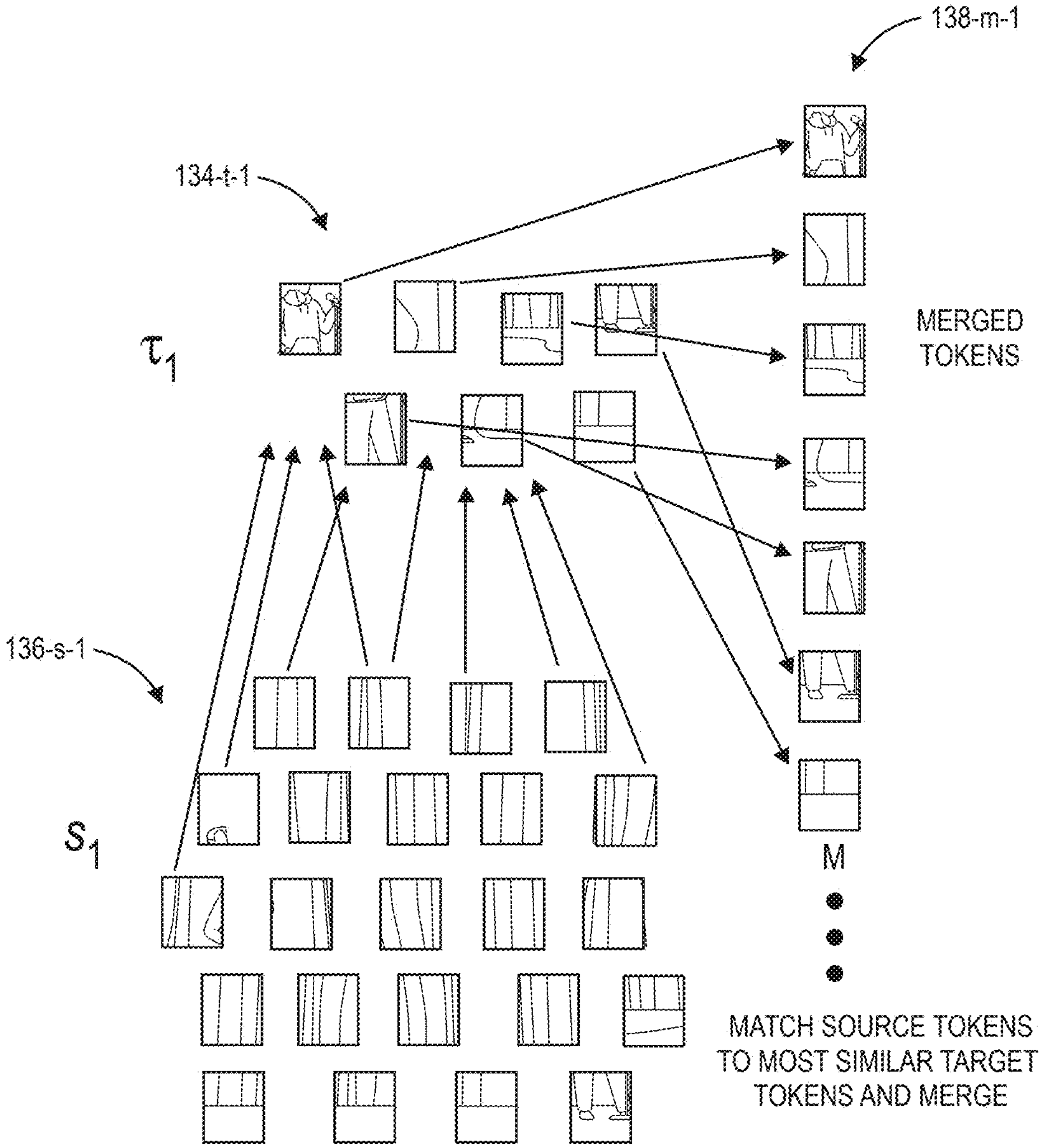

As is shown in FIG. 1C, once the tokens 135 are partitioned, each of the first set $S_1$ of source tokens 136-*s*-1 may be matched with one of the first set $\tau_1$ of the target tokens 134-*t*-1. For example, in some implementations, a cosine similarity may be calculated for each source token of the first set $S_1$ of source tokens 136-*s*-1 with respect to each target token of the first set $\tau_1$ of the target tokens 134-*t*-1. The first set $S_1$ of source tokens 136-*s*-1 of the set S may be matched with one of the first set $\tau_1$ of target tokens 134-*t*-1 to which each of the first set $S_1$ of source tokens 136-*s*-1 has a greatest cosine similarity. Accordingly, groups of the tokens 135 may be formed to include one of the first set $\tau_1$ of target tokens 134-*t*-1, and each of the source tokens 136-*s*-1 that are deemed to have greatest cosine similarities with the one of the first set $\tau_1$ of target tokens 134-*t*-1.

As is further shown in FIG. 1C, a set M of merged tokens 138-*m*-1 may be defined for each group of the tokens 135, including one of the first set $\tau_1$ of target tokens 134-*t*-1 and each of the first set $S_1$ of source tokens 136-*s*-1 matching with that one of the first set $\tau_1$ of target tokens 134-*t*-1, e.g., by average pooling. In some implementations, a number of the first set $S_1$ of source tokens 136-*s*-1 to be considered in generating one of the merged tokens 138-*m*-1 for a group may be reduced by omitting all but a predetermined number of the first set $S_1$ of source tokens 136-*s*-1 having highest similarity scores of the group.

The first set $\tau_1$ of target tokens 134-*t*-1 and the first set $S_1$ of source tokens 136-*s*-1 may be matched and merged in any manner and by any technique. For example, in some implementations, where the tokens 135 were partitioned into the first set $\tau_1$ of target tokens 134-*t*-1 and the first set $S_1$ of source tokens 136-*s*-1 by a transformer block of a transformer model, the first set $\tau_1$ of target tokens 134-*t*-1 and the first set $S_1$ of source tokens 136-*s*-1 may be matched to one another, e.g., to form groups of the tokens including one of the first set $\tau_1$ of target tokens 134-*t*-1 and the ones of the first set $S_1$ of source tokens 136-*s*-1 matching with the one of the first set $\tau_1$ of target tokens 134-*t*-1, by the transformer block that partitioned the tokens 135.

Tokens divided from individual images of a video file may be partitioned, matched and merged on multiple occasions, as necessary, to vary an amount of data that must be processed in order to classify the video file. For example, where a transformer model includes a plurality of transformer blocks, tokens divided from the individual images of the video file may be partitioned, matched and merged in series by each of such transformer blocks. As is shown in FIG. 1D, the set M of merged tokens 138-*m*-1 is generated from the tokens 135 by a first transformer block 160-1 of a transformer model and may be provided as inputs to one or more other transformer blocks of the transformer model, and ultimately to a final transformer block 160-*n* of the transformer model, which may generate a final set of merged tokens 138-*m*-*n*.

The final set of merged tokens merged tokens 138-*m*-*n* may then be provided to a plurality of prediction heads 154 of the transformer model, which may be trained to classify video files based on tokens derived from images of such video files. In some implementations, each of the merged tokens 138-*m*-*n* may be flattened, e.g., to a one-dimensional vector having a number of values corresponding to a number of pixels in the respective patches and number of channels of the images 132-L, such as three. For example, where each of the tokens 135 has dimensions of sixteen pixels by sixteen pixels, or a total of 256 pixels, and is a three-channel RGB image, the merged tokens 138-*m*-1 may be flattened to a one-dimensional vector having 768 values. Additionally, a positional encoding identifying an original position of each of the tokens 135 within the respective images 132-L may be added to each of the merged tokens 138-*m*-*n*, and the resulting merged tokens 138-*m*-*n* may be provided to the prediction heads 154 or another machine learning model (or algorithm, system or technique) in order to classify the video file 130.

Figure 1D:
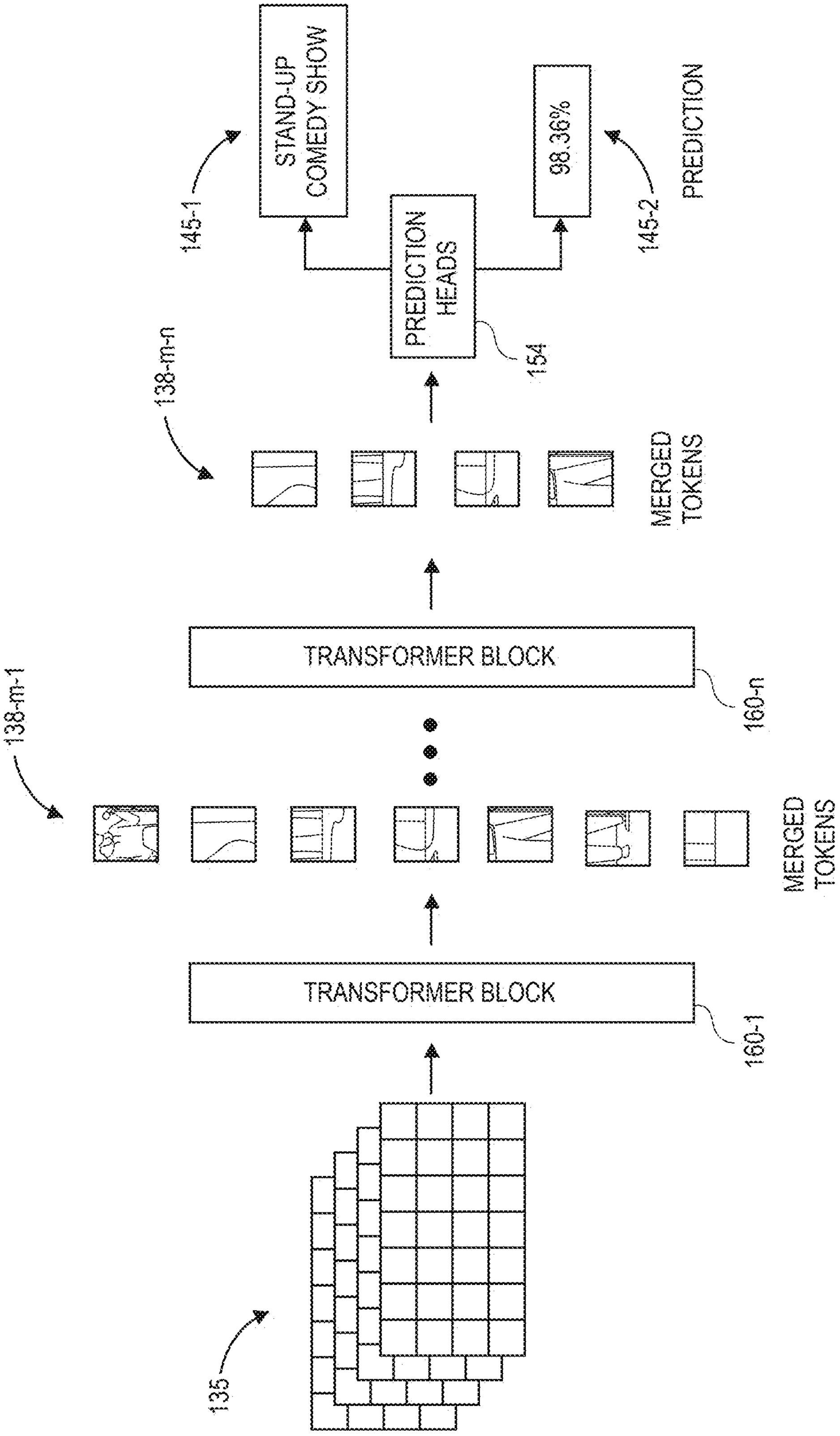

For example, as is shown in FIG. 1D, a prediction 145-1 as to a classification of the video file 130 and a confidence score 145-2 may be generated based on outputs received from the prediction heads 154 or another machine learning model (or algorithm, system or technique) in response to the set M of merged tokens 138-*m*-*n* as inputs.

Accordingly, the systems and methods of the present disclosure are directed to techniques for merging tokens for long-form video understanding that rely not only on similarity but also saliency when partitioning, matching and merging tokens of a video file in order to classify the video file.

A video file may include any number of individual images that may be extracted from the video file and divided into tokens. Such tokens may have any dimensions with respect to the individual images from which the tokens were divided, and may be partitioned into one or more sets of target tokens and one or more sets of source tokens, e.g., by a transformer block of a transformer model, or in any other manner. For example, the tokens may be partitioned in a uniform (or naïve) manner, or based on locations of each of such tokens within the image frames. Tokens may also be partitioned based on motion (e.g., velocity) of portions of images represented within such tokens, or based on saliency scores calculated for the respective tokens.

Once the tokens are partitioned into target tokens and source tokens, each of the source tokens may be matched to one of the target tokens, e.g., by a measure of similarity such as cosine similarity, or by one or more other techniques, and merged tokens may be identified from groups including one of the target tokens and any number of matching source tokens. The merged tokens may then be processed to generate embeddings therefrom, and the video file may be classified based on the embeddings, e.g., by providing the embeddings as inputs to a classifier trained to classify video files based on the embeddings.

Machine learning models (e.g., algorithms, systems or techniques), including one or more artificial neural networks, are often used to form predictions, to solve problems, to detect or recognize objects in image data, to classify such objects, to translate text from one language to another, or to perform any other tasks or functions. In various implementations, one or more of such models may perform better than rules-based systems or techniques, and may be more adaptable over time, as such models may be subject to improvement by retraining as more and more data becomes available. For such reasons, machine learning models are often adaptive to changes in conditions or objectives.

When utilized in machine learning models, such as artificial neural networks, parameters are relied upon to control activations in neurons (or nodes) within layers of the models. Weighted sums of activations of each neuron in a preceding layer of a machine learning model may be provided as inputs to an activation function, which may be a sigmoid (or logistic) function, a hyperbolic tangent function, a rectified linear unit (or "ReLU") function, or another like function that may determine the activation of a neuron in a subsequent layer of the machine learning model. In addition, a bias value may be utilized or applied to shift an output of an activation function on an axis, e.g., in a left direction or in a right direction along an x-axis, and may thus bias a neuron toward activation.

After a machine learning model, such as an artificial neural network, has been initialized, annotated training data may be used to generate a cost or "loss" function that describes a difference between an expected output of the machine learning model and an actual output generated by the machine learning model. Parameters (e.g., weights and/or biases) of a machine learning model may be updated to minimize (or maximize) the cost, as desired. For example, a machine learning model may use a gradient descent (or ascent) algorithm to incrementally adjust weights to cause a most rapid decrease (or increase) to an output of a loss function. Updating parameters of a machine learning model is often referred to as back propagation.

Transformer models (e.g., transformer machine learning models) are machine learning models that include an encoder network and a decoder network. An encoder of a transformer model is programmed or configured to take or receive an input and to generate a feature representation (e.g., feature vectors or feature maps) of the input. A feature representation generated by an encoder of a transformer model is then fed into a decoder of the transformer model that may generate an output based on the encoded feature representation. In some implementations, when a transformer model is utilized in a natural language application, e.g., an NLP or NLU application, a transformer model may take or receive sequences of words, such as sentences or paragraphs, as inputs. In some other implementations, however, a transformer model may instead take or receive a set of images of objects as inputs. For example, when a transformer model utilized in a vision application, e.g., a vision transformer, receives one or more images as inputs, the transformer model may generate patches from the images, and such patches may then serve as counterparts to words of a natural language application. Likening a vision transformer to a transformer model utilized in a natural language application, image patches may then serve as "visual words." Alternatively, or additionally, a vision transformer need not utilize a backbone network, and raw pixel values of input images may be provided as direct inputs to the vision transformer.

Generally, an encoder network of a transformer model comprises a set of encoding layers configured to process data received as inputs, one layer after another. Each encoder layer of a transformer model is configured to generate encodings (referred to herein as "tokens"). In a vision transformer, tokens may be described or characterized as visual tokens, which may include feature representations (e.g., feature vectors or feature maps) that contain information or data identifying portions of the input data that are relevant to each other. In some implementations, for each token or other encoding received as portions of input data, encoder layers may determine which parts of the token are relevant to other tokens received as part of the input data.

Each encoder layer of an encoder network of a transformer model passes a token output to a next encoder layer of the encoder network. A decoder network of the transformer model includes decoder layers that take or receive tokens generated as outputs by the encoder network and processes the tokens using encoded contextual information and an encoder-decoder attention mechanism to generate output embeddings. Each encoder layer and decoder layer of a transformer uses an attention mechanism that, for each input, weighs relevance of every other input and draws information from the inputs to generate an output. Each decoder layer further includes an additional attention mechanism that draws information from outputs of other decoders, prior to the decoder layer determining information from the encodings. Encoder layers and decoder layers further include feed-forward neural networks for additionally processing outputs, as well as residual connections and layer normalization steps.

Attention units (e.g., scaled dot-product attention units) are the basic building blocks of a transformer model. When input data is passed into a transformer model, attention weights are calculated between every token simultaneously. Attention units produce embeddings for every token in context, and such embeddings contain information not only about a token itself, but also a weighted combination of other relevant tokens weighted by the attention weights.

For each attention unit, a transformer model learns three weight matrices: query weights $W_Q$, key weights $W_K$, and value weights $W_V$. For each token i, an input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using query vectors and key vectors: an attention weight $ai_{ij}$ from token i to token j is a dot product between $q_i$ and $k_j$. Attention weights are divided by a square root of a dimension of the key vectors, or $\sqrt{d_k}$, which stabilizes gradients during training, and then passed through a SoftMax layer that normalizes the attention weights to sum to 1. Because $W_Q$ and $W_K$ are different matrices, attention may be non-symmetric: if token i attends to token j, token j does not necessarily attend to token i. An output of an attention unit for token i is a weighted sum of the value vectors of all tokens, weighted by $a_{ij}$, viz., the attention from token i to each token.

Attention calculations for all tokens may be expressed as one matrix calculation, e.g., a SoftMax function, which is useful for training due to computational matrix operation optimizations which make matrix operations fast to compute. Matrices Q, K, and V are defined as the matrices where the i-th rows are vectors $q_i$, $k_i$, and $v_i$ respectively.

$$\text{Attention}(Q, K, V) = \text{softmax}\left(\frac{QK^T}{\sqrt{d_k}}\right)V$$

One set of weight matrices ($W_Q$, $W_K$, $W_V$) is referred to herein as an attention head, and each layer in a transformer model has multiple attention heads. While one attention head attends to the tokens that are relevant to each token, a transformer model with multiple attention heads may learn to attend to tokens for different definitions of "relevance," and relevance encoded by transformer models can be interpretable by humans. For example, in a natural language context, a transformer model may include attention heads that, for every token, attend mostly to a next word, or attention heads that mainly attend from verbs to their direct objects. Where a transformer model has multiple attention heads, the transformer model may potentially capture many levels and types of relevance relations, from surface-level relationships to semantic relationships. Moreover, multiple outputs for a multi-head attention layer may be concatenated for passage into feed-forward neural network layers.

Each encoder of a transformer model comprises two primary components: a self-attention mechanism and a feed-forward neural network. A self-attention mechanism receives or takes in a set of input encodings from a previous encoder and weighs the relevance of each of the input encodings to one other in order to generate a set of output encodings. A feed-forward neural network then further processes each output encoding individually before passing such output encodings to a next encoder as an input to that next encoder, as well as the decoders.

A first encoder takes position information and embeddings of input data as an input, rather than encodings. The position information is used by a transformer model to make use of an order of the input data or in various examples described herein, such as positions of objects depicted in an image. In various examples described herein, a position embedding may describe a spatial relationship of a plurality of tokens relative to other tokens. For example, an input token may represent a grid of sixteen pixels by sixteen pixels (e.g., 16×16) or a grid of another dimension overlaid on an input frame of image data. A position embedding may describe a location of an item or a token within the grid (e.g., relative to other tokens representing other portions of an image frame). Accordingly, a position embedding may be a one-dimensional position embedding, such as in a natural language application, wherein a position of a word in a one-dimensional set of words such as a sentence, a paragraph or a document is defined, as well as multi-dimensional embeddings that describe spatial locations of tokens within input data, such as a two-dimensional position of a token within a two-dimensional image frame, or a three-dimensional position of a token within three-dimensional input data such as point clouds, or others.

Each decoder layer of a transformer model comprises three components: a self-attention mechanism (e.g., scaled dot-product attention), an attention mechanism over the encodings (e.g., "encoder-decoder" attention), and a feed-forward neural network. A decoder of a transformer model functions in a similar fashion to an encoder of a transformer model, but includes an additional attention mechanism that instead draws relevant information from the encodings generated by the encoders. In a self-attention layer, keys, values and queries are taken or received from a common place; in the case of an encoder, an output of a previous layer in the encoder. Each position in the encoder can attend to all positions in the previous layer of the encoder. In "encoder-decoder attention" layers (sometimes referred to as "cross-attention" layers), queries are received from a previous decoder layer, and keys and values come from an output of an encoder, allowing every position in a decoder to attend over all positions in an input sequence, e.g., by attending to the encoder features.

Figure 2:
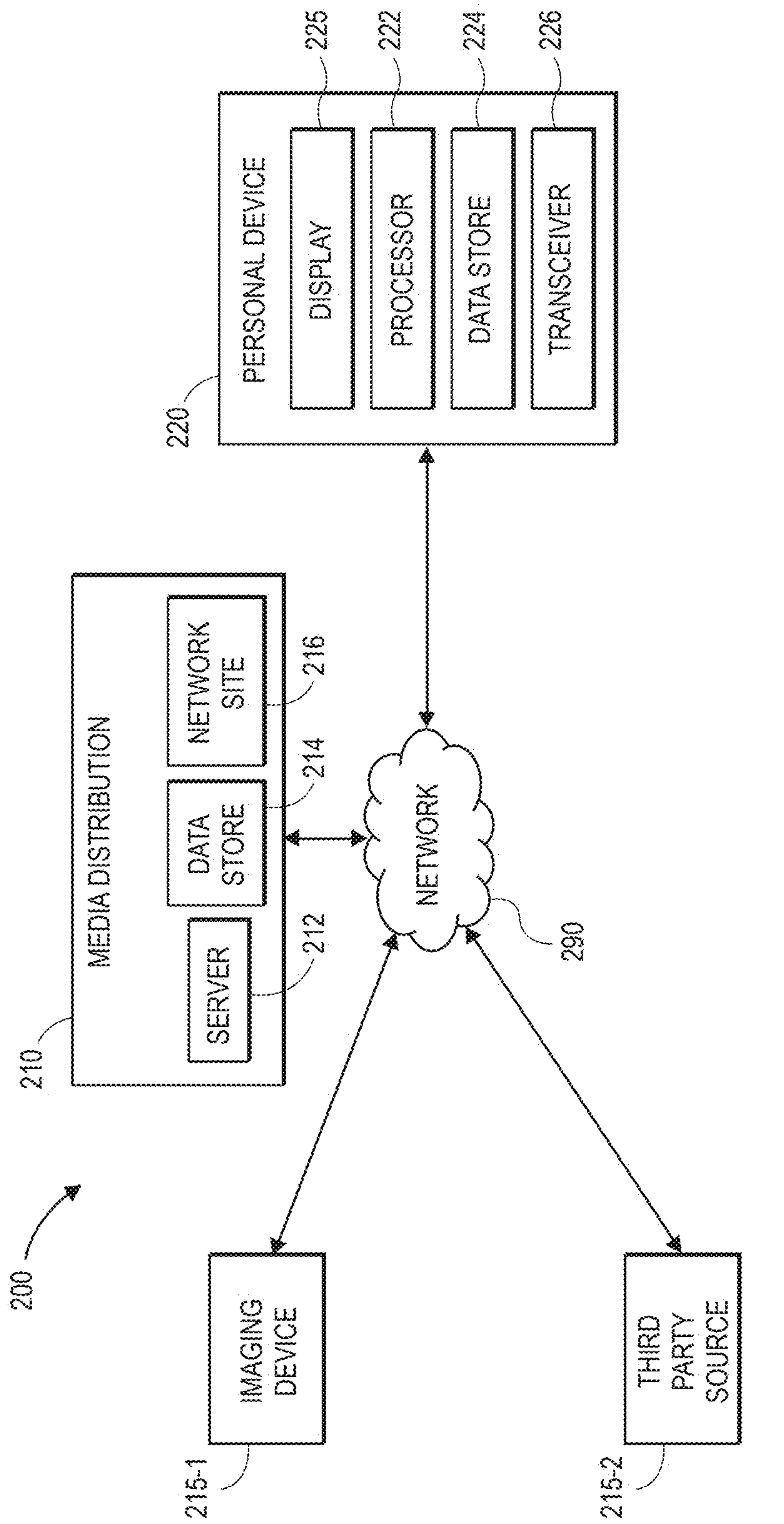
FIG. 2 is a block diagram of components of one system for merging tokens in accordance with implementations of the present disclosure.

Referring to FIG. 2, a block diagram of components of one system 200 for merging tokens in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1D.

As is shown in FIG. 2, the system 200 includes a media distribution system 210, one or more imaging devices 215-1 (e.g., cameras), one or more third-party sources 215-2 of media, and one or more personal devices 220 that may be connected to one another over one or more networks 290.

The media distribution system 210 may be any device, component or system for receiving and distributing digital media, e.g., still or moving images or other video content, audio content or other multimedia, by way of a networked computer infrastructure including one or more physical computer servers 212 and data stores 214 (e.g., databases) for hosting a network site 216 (or network sites). For example, the media distribution system 210 may be any individual or entity associated with the broadcasting, airing, storage, streaming or distribution of one or more video files received from any number of imaging devices 215-1 or third-party sources 215-2 over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor digital media, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as televisions, set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 may be configured to perform any type or form of computing function associated with the broadcasting, airing, storage, streaming or distribution of video files, including but not limited to the execution of one or more machine learning tools, algorithms or techniques. The distribution system 210 may also be configured to execute any other algorithms or techniques (e.g., object detection or recognition algorithms or techniques) associated with one or more applications, purposes or functions, and may communicate with any other external computing devices or machines over the network, through the sending and receiving of digital data.

In some implementations, the servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the broadcasting, airing, storage, streaming or distribution of one or more video files, such as receiving and granting authentication requests, or any other purpose. The servers 212 and/or the computer processors may also connect to or otherwise communicate with the networks 290, through the sending and receiving of digital data.

The imaging device 215-1 may comprise any form of optical recording sensor or device that may be used to photograph or otherwise record information or data regarding activities occurring within one or more areas or regions of a given environment, e.g., a scene or a setting, or for any other purpose. The media distribution system 210 may be associated with any number of the imaging devices 215-1, each of which may include any number of sensors, memory or storage components (e.g., a database or another data store), processors and any other components that may be required in order to capture, analyze and/or store imaging data or accompanying audio signals captured from within static or variable environments in which an imaging device 215-1 is provided. For example, one or more imaging devices 215-1 may capture one or more still or moving images, along with any relevant audio signals or other information, and may also connect to or otherwise communicate with one another, or with the networks 290.

The third-party source 215-2 may be any source of media, such as a linear channel, a television station or network, a cable television provider, a streaming service, or others. Media that is received from the third-party source 215-2 may have been captured live by one or more cameras or other imaging devices of the third-party source 215-2, or otherwise obtained in any other manner, such as by purchasing or renting rights to air the media, e.g., by way of the media distribution system 210 or in any other manner, such as files over the airwaves, via wired cable television systems, by satellite, or in any other manner.

In addition to the imaging device 215-1 or the third-party source 215-2, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution.

Additionally, the media distribution system 210 may be further configured to edit, crop, alter, modify or adjust one or more attributes of a video file. For example, where a video file is captured by the imaging device 215-1, or received from the third-party source 215-2, e.g., over the networks 290, one or more single images, or streams of images, may be captured or otherwise obtained from the video file, and transmitted to the personal device 220. The media distribution system 210 may also be configured to compare and contrast visual content and/or audio signals or metadata regarding two or more video files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220.

The media distribution system 210 may further broadcast, air, stream or otherwise distribute video files maintained in the data stores 214 to one or more users, via the personal devices 220, over the networks 290. Accordingly, in addition to the server 212, the data stores 214, and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with one or more other personal devices, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210 or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 222 may be a general-purpose or embedded processor unit such as a central processing unit (or "CPU") or a graphics processing unit (or "GPU") having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, a shopping application, and render content to the display 225 via one or more user interfaces. The processor 222 may execute one or more computer-based instructions that may be stored in the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceivers 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems (not shown) via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

Moreover, those of ordinary skill in the pertinent arts will further recognize that, alternatively, in some implementations, the personal device 220 need not be associated with a given user. For example, the personal device 220 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, one imaging device 215-1, one third-party source 215-2, one personal device 220, and one network 290, those of ordinary skill in the pertinent arts will recognize that any number of media distribution systems 210, imaging devices 215-1, third-party sources 215-2, personal devices 220, or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220, and such content may include multiple types or forms of media provided by multiple content sources. Moreover, the personal devices 220 with which users interact to access, view and interact with content may include all or fewer of the components shown in FIG. 2 or perform all or fewer of the functions described herein. For example, a user may view content on one personal device 220, and execute interactions relating to that content on another personal device 220, using a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 over multiple networks 290. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another. For example, the server 212 and the personal device 220 may be configured to transmit information or data in the form of synchronous or asynchronous messages to one another in real time or in near-real time, or in one or more offline processes, via the networks 290. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the server 212, the processor 222, or to any other computers or control systems utilized by the media distribution system 210, the personal device 220, and having sequences of instructions which, when executed by a processor (e.g., a CPU or a GPU), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content" or "media" may refer to audio and/or video files that may be presented by one or more of a personal device directly, or by a personal device via a media streaming device, and may include but are not limited to information, data or metadata including or relating to such audio and/or video files.

Figure 3:
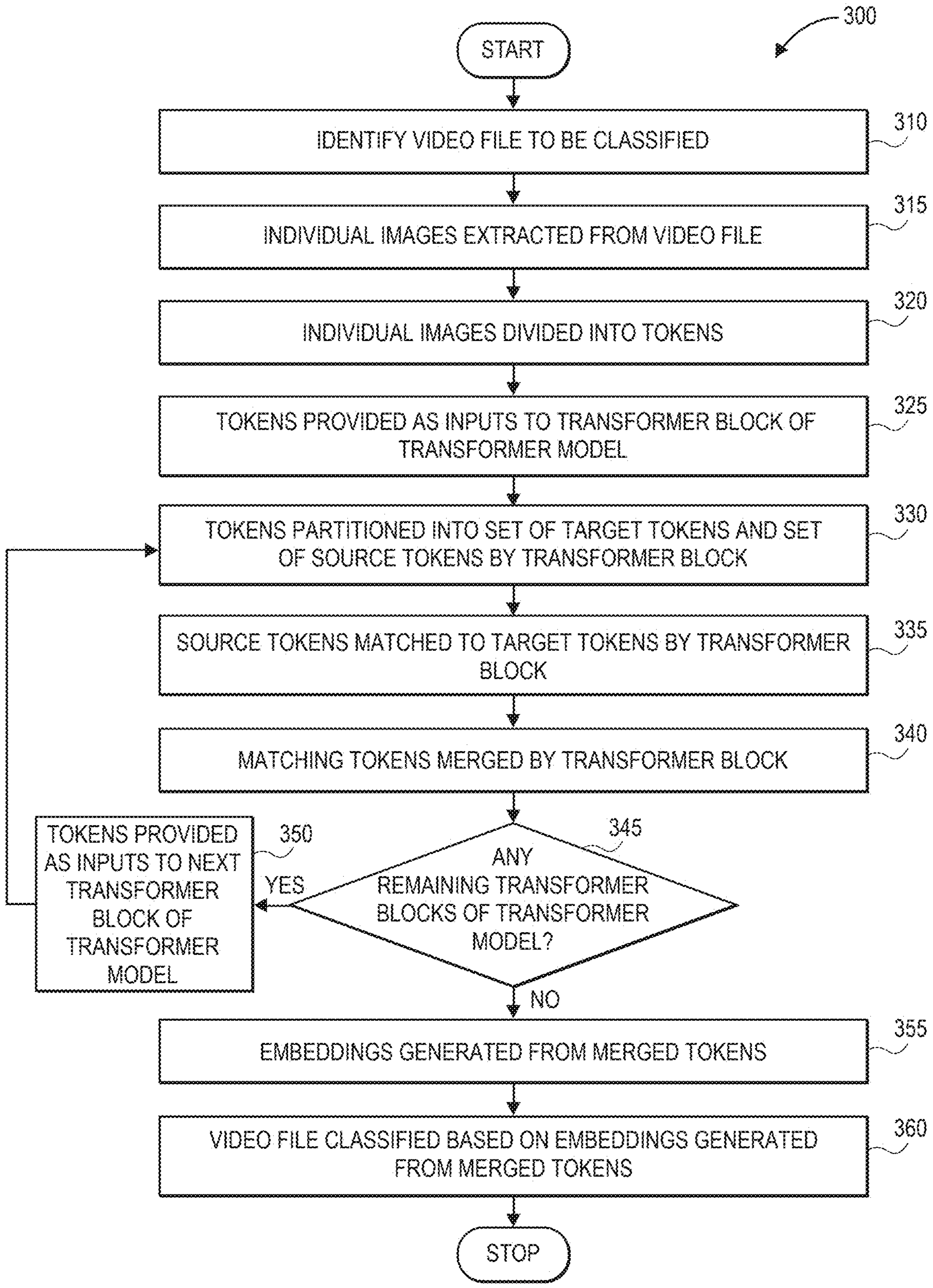
FIG. 3 is a flow chart of one process for merging tokens in accordance with implementations of the present disclosure.

Referring to FIG. 3, a flow chart 300 of one process for merging tokens in accordance with implementations of the present disclosure is shown. At box 310, a video file that is to be classified is identified. The video file may be of any duration, and may include visual content (e.g., visual images) only, or may include visual content and also audible signals (e.g., multimedia). The visual images of the video file may be of any pixel density or resolution, and may have been captured at any frame rate, e.g., thirty frames per second, or any other frame rate. In some implementations, the video file may have been calculated previously, and may be stored or maintained in one or more data stores. In some other implementations, however, the video file may have been captured in real time or in near-real time, and may be identified for classification accordingly.

At box 315, individual image frames are extracted from the video file. The image frames may be extracted in any manner and using any application, technique or tool. In some implementations, each of the individual images of the video file may be extracted therefrom, e.g., on a frame-by-frame basis. Alternatively, in some other implementations, fewer than all of the individual images may be extracted from the video file. For example, individual image frames may be extracted from the video file at selected or periodic intervals, e.g., every n-th image frame may be extracted from the video file, or a single image frame may be extracted from the video file per every unit of time, such as one image frame per second.

At box 320, the individual images extracted from the video file are divided into tokens, or patches. Each of the individual images extracted at box 315 may be divided into smaller patches or other subsets of a fixed size, in a non-overlapping manner. In some implementations, where each of the images are two hundred fifty-six pixels by two hundred fifty-six pixels, the images may be divided into patches of approximately sixteen pixels by sixteen pixels each.

The individual images may be processed in any manner, as necessary, prior to tokenizing the images into patches. For example, in some implementations, each of the images may be resized as necessary, to ensure that the images may be tokenized in their entirety into a whole number of patches.

At box 325, the tokens are provided as inputs to a transformer block of a transformer model. For example, the transformer model may include an encoder, and any number of transformer blocks including an attention mechanism for determining a relative importance of tokens in a sequence of input data or grouping relevant tokens for context, as well as a dropout layer, a video token merging block provided after the dropout layer and a linear block, e.g., a fully connected layer, or a dense layer, that performs a linear mapping from a vector space to an original input domain.

At box 330, the tokens divided from the individual images of the video file are partitioned into a set of target tokens and a set of source tokens by the transformer block of the transformer model. For example, where the video file is divided into N tokens (or patches), the transformer block may partition the N tokens by a partition factor $\gamma$ such that a set T of target tokens includes $N/\gamma$ tokens, and a set S of source tokens includes $N(\gamma-1)/\gamma$ tokens. In accordance with implementations of the present disclosure, a partition factor $\gamma$ may have any value, e.g., an integer (or whole number) between two and ten inclusive, such as 2, 3, 4, 5, 6, 7, 8, 9 or 10, or any other value. In some implementations, a positional encoding identifying an original position of each of the tokens within an image may be added to the tokens.

The set T of target tokens may be selected in accordance with one or more selected functions. For example, according to a naïve selection function, where a partition factor $\gamma$ is selected, every $\gamma$-th token of the N tokens divided from the individual images of the video file is selected, e.g., according to uniform partitioning, such that $N/\gamma$ tokens are selected in a uniform pattern across each of the individual images.

According to a region-concentrated selection function, the set T of target tokens may be selected based on locations of the respective tokens within each of the individual images. For example, each of the individual images may be divided into a central region and a boundary region, and differing numbers of tokens may be selected from one of the respective regions. For example, in some implementations, a central region of an individual image may be defined about a center of the individual image and may have dimensions of H/2 by W/2, where H and W are a height and a width of the individual image, respectively. In such implementations, a boundary region of an individual image may be defined to include all portions other than the central region of the individual image.

In some implementations, where central regions of the individual images are expected to contain more relevant or important information, a smaller partition factor may be applied to patches of the central regions, thereby causing more tokens from a central region to remain unmerged, and a larger partition factor may be applied to patches of the boundary regions, thereby causing more tokens from a boundary region to be merged with one another. Alternatively, in some other implementations, where boundary regions of an individual image are expected to contain more relevant or important information, a smaller partition factor may be applied to patches of the boundary regions, thereby causing more tokens from a boundary region to remain unmerged, and a larger partition factor may be applied to patches of the central regions, thereby causing more tokens from a central region to be merged with one another.

According to a motion-based selection function, the set T of target tokens may be selected by calculating a motion vector $v_i$ for each of the N tokens $x_i$ divided from the individual images of the video file, and calculating sampling probabilities $p_i$ for the N tokens based on the respective motion vectors. The set T of target tokens may be constructed by sampling $N/\gamma$ tokens from the N tokens with the sampling probabilities $p_i$ calculated for the respective $N/\gamma$ tokens. In some implementations, the sampling probabilities $p_i$ may be calculated according to a SoftMax function based on the respective motion vectors.

According to a learnable selection function, the set T of target tokens may be selected by calculating saliency scores of each token and selecting the set T of target tokens based on such saliency scores. For example, in some implementations, a query, a key and a value may be obtained using learnable projection matrices, and self-attention may be performed on the query, the key and the value. Subsequently, saliency scores for the tokens may be calculated for each of the N tokens using the key and a learnable matrix. Sampling probabilities $p_i$ may be calculated for the N tokens based on their respective saliency scores. The set T of target tokens may be constructed by sampling $N/\gamma$ tokens from the N tokens with the sampling probabilities $p_i$ calculated for the respective $N/\gamma$ tokens. The N tokens having comparatively high levels of saliency may more likely be selected as target tokens, and the N tokens having comparatively low levels of saliency may more likely be selected as source tokens.

At box 335, each one of the source tokens is matched to a most similar one of the target tokens by the transformer block. For example, in some implementations, for a given one of the set S of source tokens, a most similar token in the set T of target tokens may be identified by calculating measures of similarity, such as cosine similarities, between a key vector corresponding to the one of the set S of source tokens and each of the key vectors corresponding to the respective tokens in the set T. Upon matching each of the set S of source tokens with one of the set T of target tokens, a plurality of groups of tokens are formed, with each of the groups consisting of one of the set T of target tokens and each of the set S of source tokens for which the one of the set T of target tokens was identified as most similar.

At box 340, the matching tokens of the respective groups are merged, e.g., by average pooling, by the transformer block. In some implementations, a number of tokens in a group may be reduced to include only a predetermined number of source tokens having the highest levels of similarity with the target token.

At box 345, whether the transformer model has any remaining transformer blocks is determined. If the transformer model includes one or more remaining transformer blocks, then the process advances to box 350, where the tokens generated by merging at box 340 are provided as inputs to a next transformer block of the transformer model. The process then returns to box 330, where the tokens are partitioned into a set of target tokens and a set of source tokens by the next transformer block of the transformer model.

If the transformer model does not include any other transformer blocks, such that the merged tokens generated at box 340 are generated by the final transformer block of the transformer model, however, then the process advances to box 355, where a set of embeddings is generated from the merged tokens generated at box 340. The set of embeddings may be lower-dimensional vector representations of the merged tokens generated by providing the merged tokens as inputs to one or more convolutional neural networks or other machine learning algorithms, systems or techniques. Alternatively, the set of embeddings may be generated in any other manner.

At box 360, the video file is classified based on the embeddings generated from the merged tokens at box 355, and the process ends. For example, the video file may be classified generally, e.g., as a member of a category, such as a cartoon, a documentary, a music video or a news program. Alternatively, the video file may be classified specifically based on visual content of the video file, such as an identifier of one or more actors or actions depicted within the video file. Moreover, the classification of the video file may further include a confidence score indicating a level of confidence in the classification.

Although FIG. 3 includes boxes corresponding to steps or functions that are performed by transformer blocks of a transformer model, e.g., boxes 325, 330, 335, 340, those of ordinary skill in the pertinent arts will recognize that such steps or functions need not be performed by a transformer model, and may instead be performed in any other manner, including by one or more other machine learning models (or algorithms, systems or techniques) other than a transformer model. The systems and methods of the present disclosure need not be limited to transformer architectures.

Figure 4A:
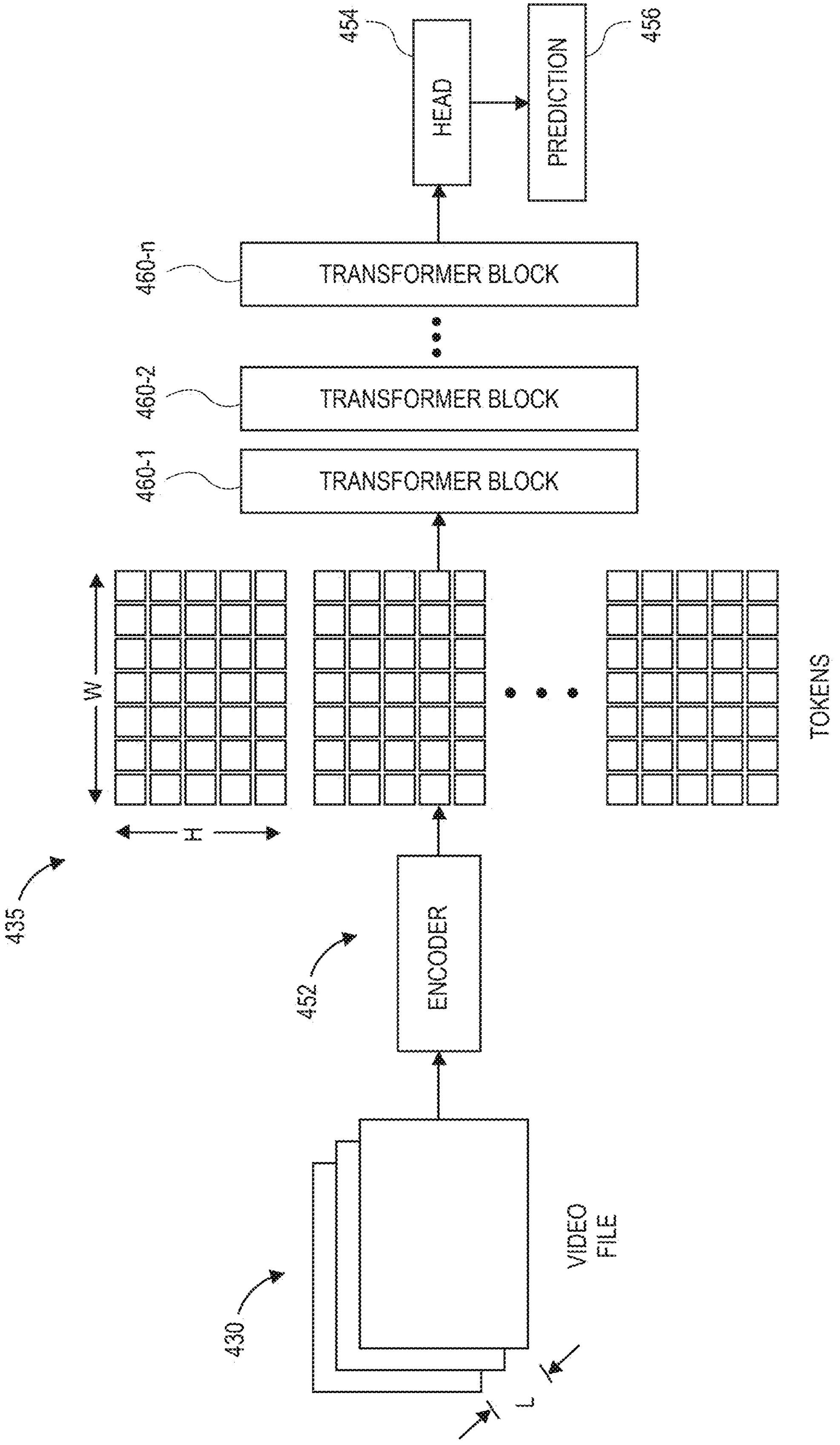
FIGS. 4A and 4B are views of aspects of one system for merging tokens in accordance with implementations of the present disclosure.
Figure 4B:
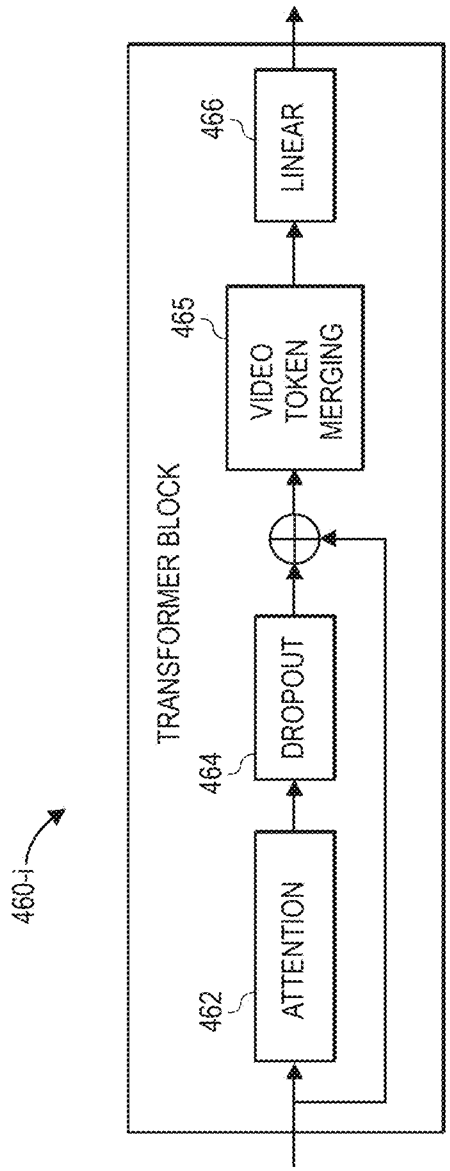

Referring to FIGS. 4A and 4B, views of aspects of one system for merging tokens in accordance with implementations of the present disclosure is shown. Except where otherwise noted, reference numerals preceded by the number "4" shown in FIG. 4A or 4B indicate components or features that are similar to components or features having reference numerals preceded by the number "2" shown in FIG. 2 or by the number "1" shown in FIGS. 1A through 1D.

As is shown in FIGS. 4A and 4B, a video file 430 including any number L of individual images is provided as inputs to an encoder 452 of a transformer model, which may generate a set of tokens 435 therefrom.

The set of tokens 435 generated by the encoder 452 are provided as inputs to any number of transformer blocks 460-1, 460-2 . . . **460-*n* of the transformer model, which may update the set of tokens 435, e.g., by partitioning, matching and merging such tokens. Although FIG. 4A shows three boxes for a plurality of transformer blocks 460-1, 460-2 . . . 460**-*n*, those of ordinary skill in the pertinent arts will recognize that a transformer model may include any number of transformer blocks in accordance with the present disclosure.

The prediction head 454 of the transformer model generates a prediction 456 as to a classification of the video file 430, and a confidence level in the prediction 456.

As is shown in FIG. 4B, a representative transformer block 460-*i* of the plurality of transformer blocks 460-1, 460-2 . . . 460-*n* includes an attention mechanism 462 for determining relative importance of tokens in a sequence of input data or grouping relevant tokens for context, a dropout layer 464 for preventing overfitting or co-adapting of the transformer model, a video token merging block 465 provided after the dropout layer 464 and a linear block 466. In some implementations, the linear block 466 may be a fully connected layer, or a dense layer, that performs a linear mapping from a vector space to an original input domain.

The video token merging block 465 may reduce a number of tokens in accordance with implementations of the present disclosure, such as by partitioning the tokens into target tokens and source tokens, e.g., according to a partition factor or in any other manner, before matching source tokens to target tokens, and merging a target token with each of the source tokens matched thereto. Where each of the plurality of transformer blocks 460-1, 460-2 . . . 460-*n* includes one of video token merging blocks 465, the transformer model may successively reduce a total number of the tokens, based on the respective saliency of the tokens, and thus an amount of data that must be processed in order to classify the video file 430.

As is discussed above, tokens divided from images of a video file may be partitioned into target tokens and source tokens that are matched with the target tokens and merged. In accordance with implementations of the present disclosure, tokens divided from images of a video file may be partitioned in any manner.

Figure 5:
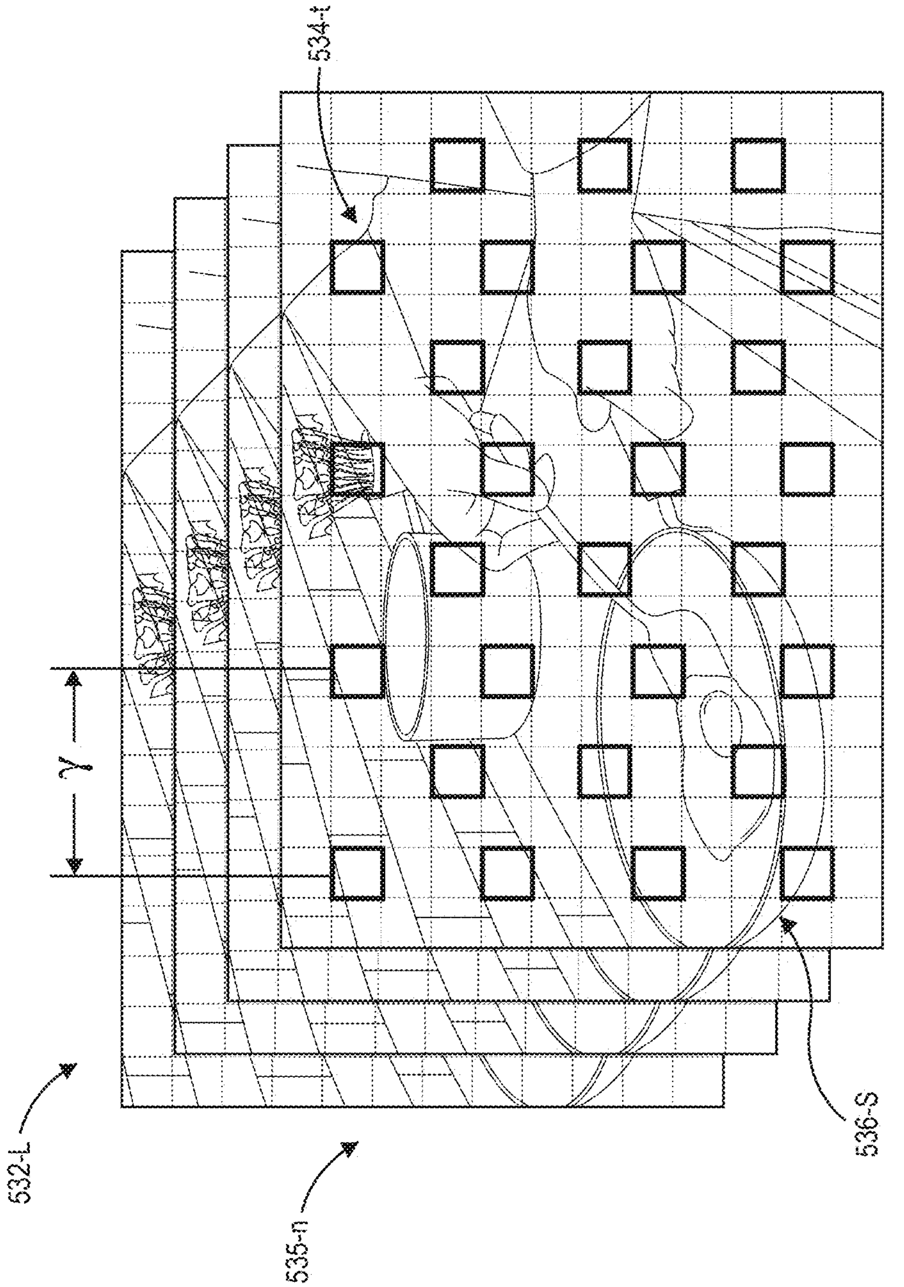
FIG. 5 is a view of aspects of one system for merging tokens in accordance with implementations of the present disclosure.

Referring to FIG. 5, a view of aspects of one system for merging tokens in accordance with implementations of the present disclosure is shown. Except where otherwise noted, reference numerals preceded by the number "5" shown in FIG. 5 indicate components or features that are similar to components or features having reference numerals preceded by the number "4" shown in FIG. 4A or 4B, by the number "2" shown in FIG. 2 or by the number "1" shown in FIGS. 1A through 1D.

As is shown in FIG. 5, tokens 535-*n* divided from a plurality of images 532-L may be partitioned in a uniform manner based on a partition factor $\gamma$, such that every $\gamma$-th token of the tokens 535-*n* is selected as target tokens 534-*t*, and tokens other than the $\gamma$-th token are selected as source tokens 536-*s*. Subsequently, each of the source tokens 536-*s* may be matched with one of the target tokens 534-*t*, and groups of tokens including one of the target tokens 534-*t* and the matching source tokens 536-*s* are merged, e.g., by average pooling. The plurality of images 532-L may be classified based on the merged tokens.

Figure 6:
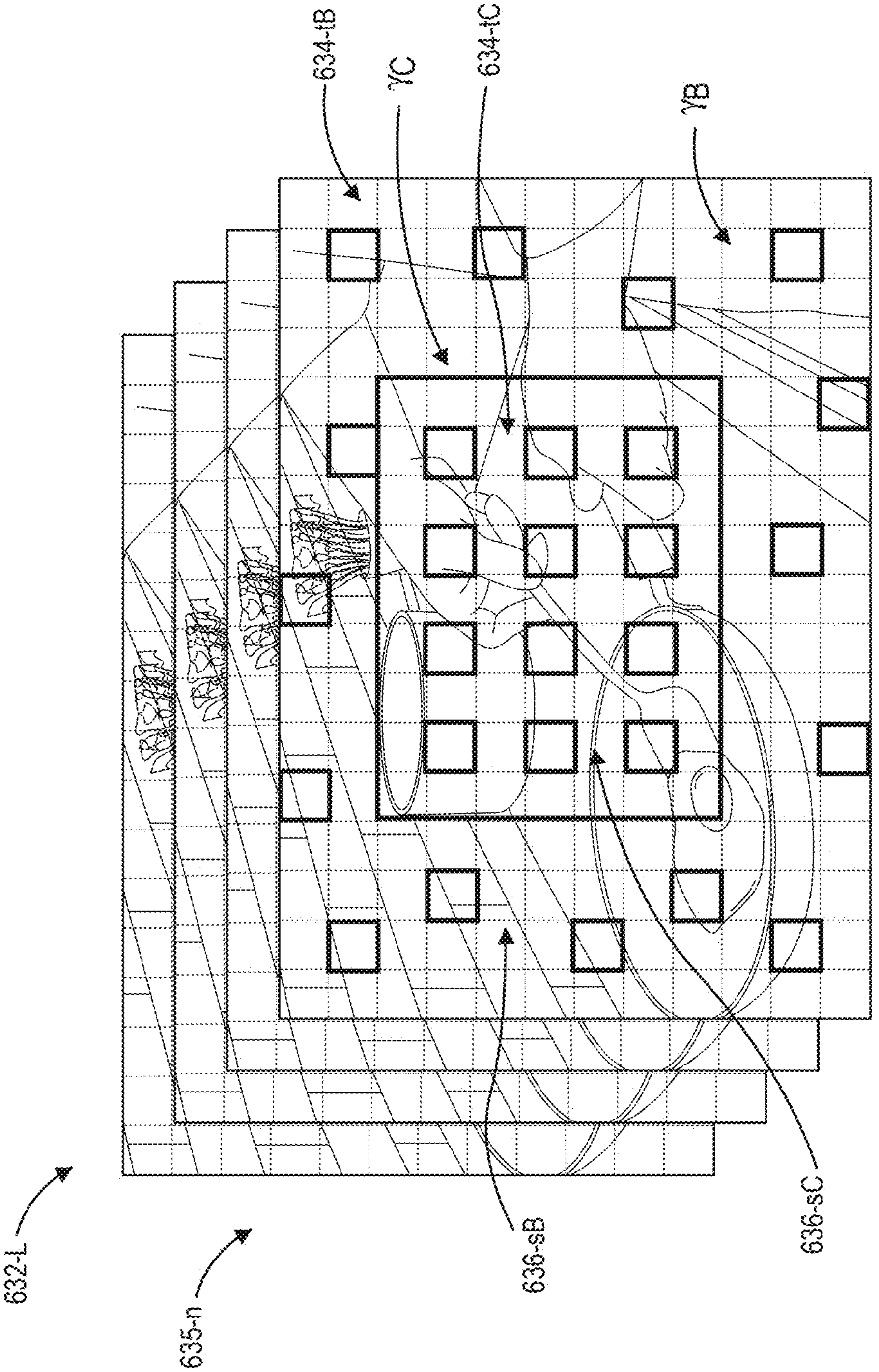
FIG. 6 is a view of aspects of one system for merging tokens in accordance with implementations of the present disclosure.

Referring to FIG. 6, a view of aspects of one system for merging tokens in accordance with implementations of the present disclosure is shown. Except where otherwise noted, reference numerals preceded by the number "6" shown in FIG. 6 indicate components or features that are similar to components or features having reference numerals preceded by the number "5" shown in FIG. 5, by the number "4" shown in FIG. 4A or 4B, by the number "2" shown in FIG. 2 or by the number "1" shown in FIGS. 1A through 1D.

As is shown in FIG. 6, tokens 635-*n* divided from a plurality of images 632-L may be partitioned based on their locations within the respective images 632-L. For example, as is shown in FIG. 6, a boundary region and a central region are defined for each of the images 632-L. A partition factor $\gamma_B$ is selected for the boundary region, and a partition factor $\gamma_C$ is selected for the central region. A set of target tokens 634-tB and a set of source tokens 636-sB are selected for the boundary region based on the partition facto $\gamma_B$, and a set of target tokens 634-tC and a set of source tokens 636-sC are selected for the central region based on the partition factor $\gamma_C$. Subsequently, each of the source tokens 636-sB, 636-sC are matched with one of the target tokens 634-tB, 634-tC, and groups of tokens including one of the target tokens 634-tB, 634-tC and the matching source tokens 636-sB, 636-sC are merged, e.g., by average pooling. The plurality of images 632-L may be classified based on the merged tokens.

Figure 7:
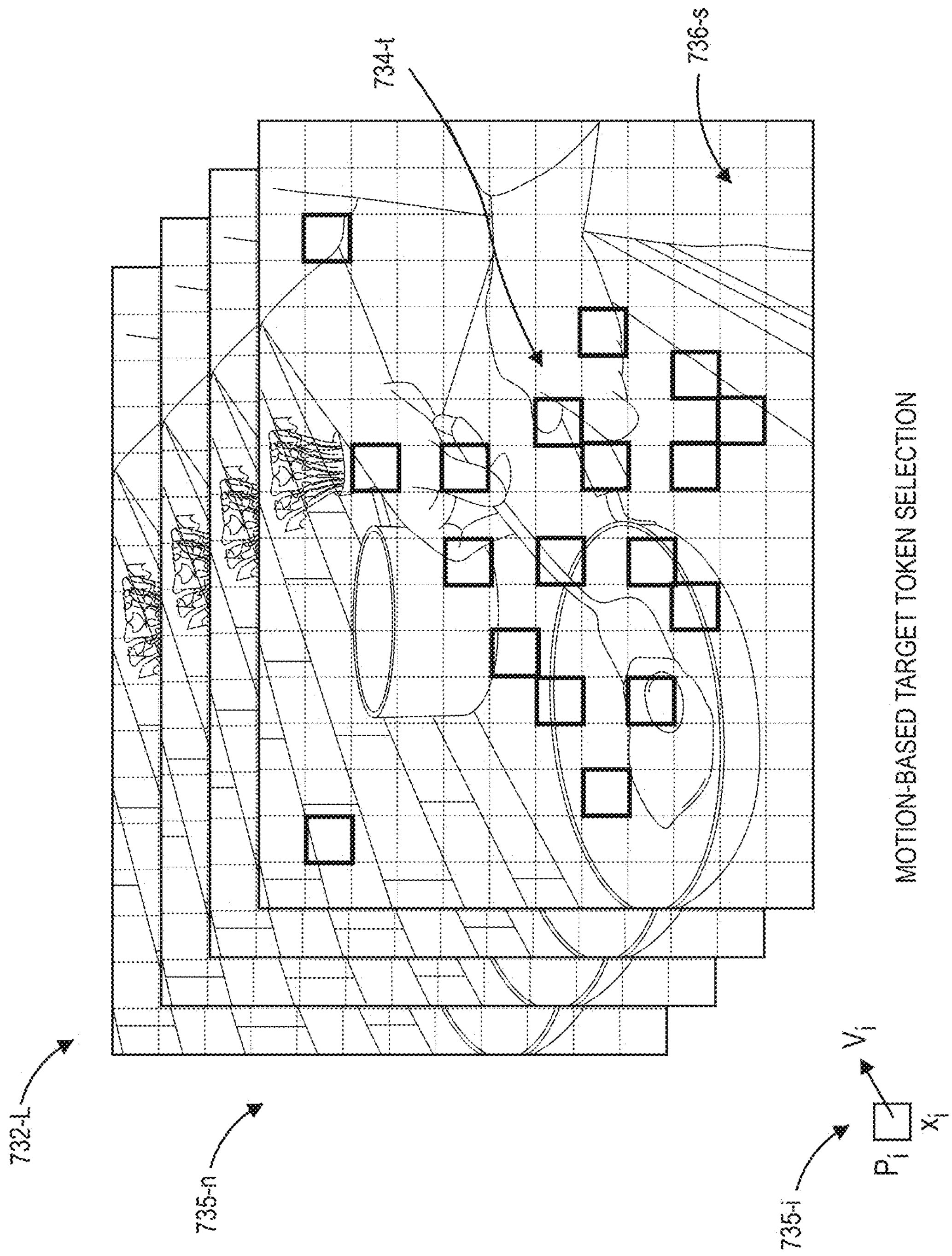
FIG. 7 is a view of aspects of one system for merging tokens in accordance with implementations of the present disclosure.

Referring to FIG. 7, a view of aspects of one system for merging tokens in accordance with implementations of the present disclosure is shown. Except where otherwise noted, reference numerals preceded by the number "7" shown in FIG. 7 indicate components or features that are similar to components or features having reference numerals preceded by the number "6" shown in FIG. 6, by the number "5" shown in FIG. 5, by the number "4" shown in FIG. 4A or 4B, by the number "2" shown in FIG. 2 or by the number "1" shown in FIGS. 1A through 1D.

As is shown in FIG. 7, a motion vector $v_i$ is calculated for each representative token 735-*i*, or $x_i$, of a plurality of n tokens 735-*n* divided from a plurality of images 732-L. A sampling probability $p_i$ may be calculated for each token 735-*i*, or $x_i$, of the plurality of n tokens 735-*n* based on the motion vector $v_i$ calculated for that token 735-*i* and motion vectors calculated for all of the n tokens 735-*n*, e.g., according to a SoftMax function. A set of target tokens 734-*t* is selected from the n tokens 735-*n* based on a partition factor 7, such by selecting n/$\gamma$ tokens according to the calculated sampling probabilities. A set of source tokens 736-*s* may be defined to include each of the tokens 735-*n* other than the n/$\gamma$ tokens of the set of target tokens 734-*t*. Subsequently, each of the source tokens 736-*s* may be matched with one of the target tokens 734-*t*, and groups of tokens including one of the target tokens 734-*t* and the matching source tokens 736-*s* are merged, e.g., by average pooling. The plurality of images 732-L may be classified based on the merged tokens.

Figure 8A:
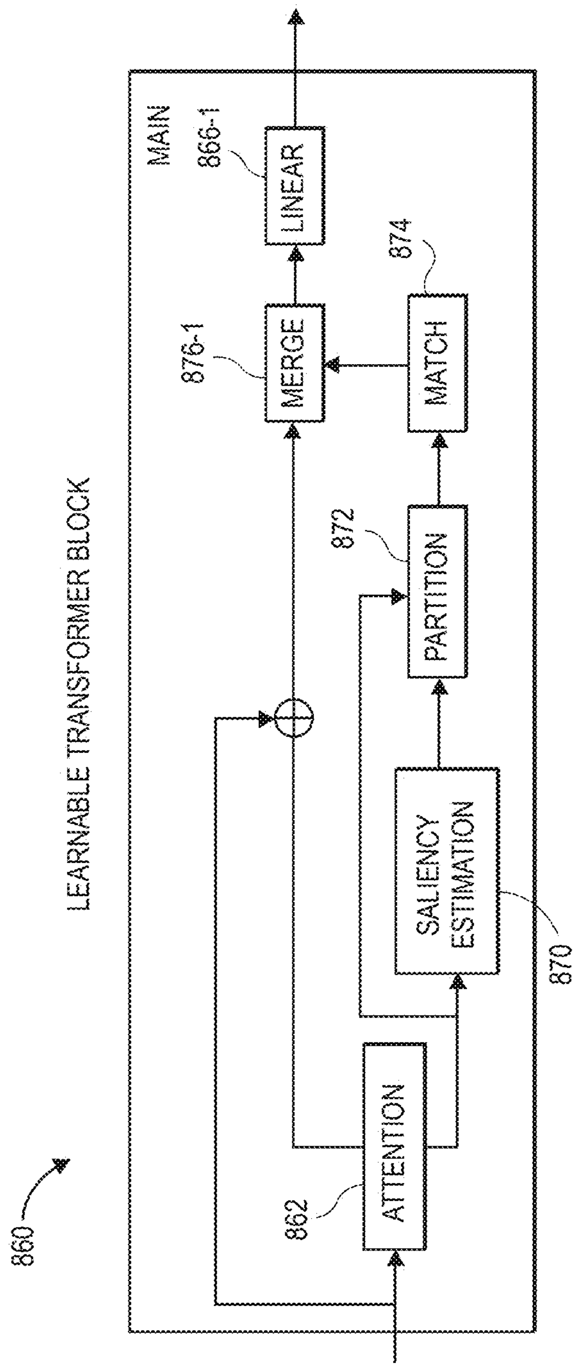
FIGS. 8A and 8B are views of aspects of one system for merging tokens in accordance with implementations of the present disclosure.
Figure 8B:
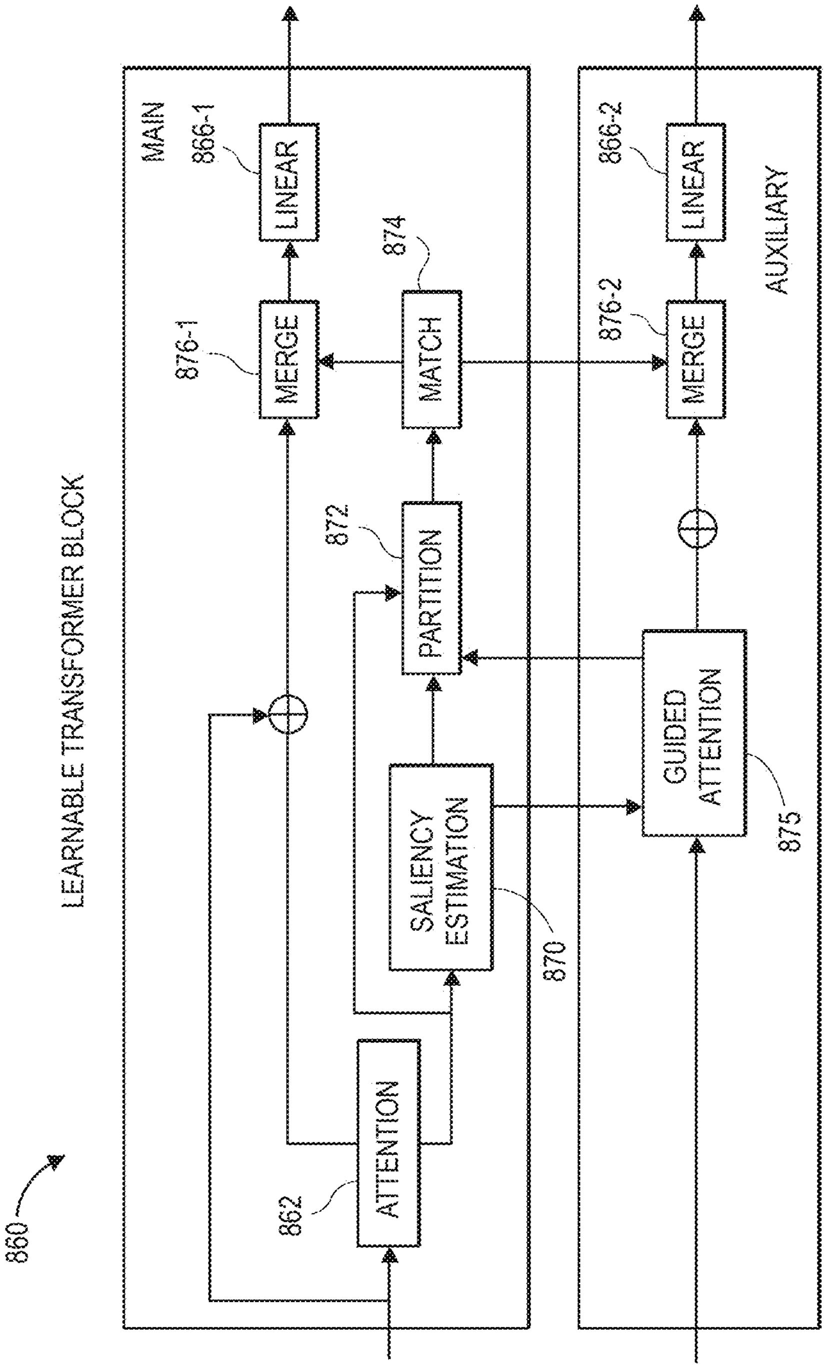

Tokens may be partitioned into target tokens and source tokens by a learning model that is trained to calculate saliency scores for the respective tokens. Referring to FIGS. 8A and 8B, views of aspects of one system for merging tokens in accordance with implementations of the present disclosure are shown. Except where otherwise noted, reference numerals preceded by the number "8" shown in FIG. 8A or 8B indicate components or features that are similar to components or features having reference numerals preceded by the number "7" shown in FIG. 7, by the number "6" shown in FIG. 6, by the number "5" shown in FIG. 5, by the number "4" shown in FIG. 4A or 4B, by the number "2" shown in FIG. 2 or by the number "1" shown in FIGS. 1A through 1D.

As is shown in FIG. 8A, a transformer block 860 of the present disclosure includes a main path having an attention component 862, a saliency estimation component 870, a partition component 872, a matching component 874, a merging component 876-1 and a linear component 866-1.

Where a tensor of N tokens, or X, is divided from images of a video file and provided to the transformer block 860, the attention component 862 is configured to determine a query Q, a key K and a value V based on the tokens X and learnable projection matrices $U_q$, $U_k$, $U_v$, or $Q=XU_q$, $K=XU_k$ and $V=XU_v$. An updated set of tokens, or X', is determined based on the query, the key, and the value by attention according to a SoftMax function.

Additionally, the saliency estimation component 870 is further configured to calculate a set of saliency scores S for the tokens X' based on the key K and a learnable matrix $U_s$. The partition component 872 is configured to partition the tokens X into target tokens and source tokens based on the saliency scores S calculated by the saliency estimation component 870. The matching component 874 is configured to match source tokens to target tokens, e.g., based on cosine similarities. The merging component 876-1 thus merges each target token identified by the partition component 872 with all of the source tokens matching to that target token by the matching component 874. The linear component 866-1 may perform a linear mapping of the merged tokens to an original input domain.

Because the partitioning of tokens is non-differentiable, the learnable matrix $U_s$ may not be trained with the main path of the transformer block 860 of FIG. 8A alone, but may instead be trained by an auxiliary path of the transformer block 860. As is shown in FIG. 8B, the auxiliary path of the transformer block 860 further includes a guided attention component 875, a merge component 876-2 and a linear component 866-2.

For example, a tensor of N auxiliary tokens, or $X_{AUX}$, may be divided from images of a video file and provided to the transformer block 860. The guided attention component 875 is configured to determine an auxiliary query $Q_{AUX}$, an auxiliary key $K_{AUX}$ and an auxiliary value $V_{AUX}$ based on the auxiliary tokens $X_{AUX}$ and learnable projection matrices $U_q$, $U_k$, $U_v$, or $Q_{AUX}=X_{AUX}U_q$, $K_{AUX}=X_{AUX}U_k$ and $V_{AUX}=X_{AUX}U_v$. The guided attention component 875 may be further configured to estimate levels of saliency of one or more of the tokens, and to perform attention operations based on the estimated levels of saliency. An updated set of auxiliary tokens, or $X'_{AUX}$, is determined based on the auxiliary query, the auxiliary key, and the auxiliary value by guided attention according to a SoftMax function.

Additionally, the merging component 876-2 may thus merge each target token identified by the partition component 872 with all of the source tokens identified as matching to that target token by the matching component 874. The linear component 866-2 may perform a linear mapping of the merged tokens to an original input domain.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer system comprising at least one processor and at least one data store, wherein the computer system is programmed with one or more sets of instructions that, when executed by the at least one processor, cause the computer system to execute a method comprising:

receiving a video file over one or more networks;

extracting a plurality of image frames from the video file;

dividing the plurality of image frames into a plurality of tokens, wherein each one of the plurality of tokens has common dimensions, and wherein the plurality of tokens do not overlap;

processing the plurality of image frames by a transformer model, wherein processing the plurality of image frames comprises:

selecting a set of target tokens from the plurality of tokens by at least a first transformer block of the transformer model, wherein the set of target tokens is selected according to at least one partition factor;

matching each one of a set of source tokens with one of the set of target tokens, wherein the set of source tokens includes each one of the plurality of tokens not included in the set of target tokens;

defining a plurality of groups of tokens, wherein each one of the plurality of groups comprises one of the set of target tokens and one of the set of source tokens matched to the one of the set of target tokens;

defining a plurality of merged tokens, wherein each one of the plurality of merged tokens is defined for one of the plurality of groups of tokens; and classifying the video file based at least in part on the plurality of merged tokens.

2. The computer system of claim 1, wherein matching each one of the set of source tokens with one of the set of target tokens comprises:

calculating, for each one of the set of source tokens, cosine similarities between the one of the set of source tokens and each one of the set of target tokens; and determining, for each one of the set of source tokens, the one of the set of target tokens having a greatest cosine similarity with the one of the set of source tokens, wherein each one of the set of source tokens is matched with the one of the set of target tokens having the greatest cosine similarity with the one of the set of source tokens, and wherein defining the plurality of merged tokens comprises:

calculating, for each one of the plurality of groups of tokens, one of the plurality of merged tokens by an average pooling technique based on one of the set of target tokens and the one of the set of source tokens matched with the one of the set of target tokens.

3. The computer system of claim 1, wherein each of the plurality of image frames of the video file has dimensions of approximately two hundred fifty-six pixels by two hundred fifty-six pixels, and wherein each of the plurality of tokens has dimensions of approximately sixteen pixels by sixteen pixels.

4. A computer-implemented method comprising:

dividing a plurality of image frames of a video file into a first plurality of tokens;

partitioning, by at least one block of a transformer model, the first plurality of tokens into at least a first set of target tokens and a first set of source tokens, wherein the first plurality of tokens is partitioned based at least in part on at least one of:

motion of one of the first plurality of tokens;

a position of the one of the first plurality of tokens; or saliency of the one of the first plurality of tokens;

matching, by at least one block of the transformer model, each one of the first set of source tokens to one of the first set of target tokens;

forming, by at least one block of the transformer model, a first plurality of groups of tokens, wherein each one of the first plurality of groups comprises one of the first set of target tokens and ones of the first set of source tokens matched with the one of the first set of target tokens;

generating, by at least one block of the transformer model, a second plurality of tokens, wherein each one of the second plurality of tokens is generated for one of the first plurality of groups of tokens; and classifying the video file based at least in part on the second plurality of tokens.

5. The computer-implemented method of claim 4, wherein the transformer model comprises a first block and a second block, wherein the second plurality of tokens is generated by the first block of the transformer model, and wherein classifying the video file based at least in part on the second plurality of tokens comprises:

partitioning, by the second block of the transformer model, the second plurality of tokens into at least a second set of target tokens and a second set of source tokens, wherein the second plurality of tokens is partitioned based at least in part on at least one of:

motion of one of the second plurality of tokens;

a position of the one of the second plurality of tokens; or saliency of the one of the second plurality of tokens;

matching, by the second block of the transformer model, each one of the second set of source tokens to one of the second set of target tokens;

forming, by the second block of the transformer model, a second plurality of groups of tokens, wherein each one of the second plurality of groups comprises one of the second set of target tokens and ones of the second set of source tokens matched with the one of the second set of target tokens; and generating, by the second block of the transformer model, a third plurality of tokens, wherein each one of the third plurality of tokens is generated for one of the second plurality of groups of tokens, and wherein the video file is classified based at least in part on the third plurality of tokens.

6. The computer-implemented method of claim 4, wherein generating the second plurality of tokens comprises:

calculating, for each one of the first plurality of groups, one of the second plurality of tokens by an average pooling technique based on one of the first set of target tokens and the ones of the first set of source tokens matched with the one of the first set of target tokens.

7. The computer-implemented method of claim 4, wherein matching each one of the first set of source tokens to one of the first set of target tokens comprises:

calculating, for each one of the first set of source tokens, measures of similarity between the one of the first set of source tokens and each one of the first set of target tokens; and determining, for each one of the first set of source tokens, the one of the first set of target tokens having a greatest measure of similarity with the one of the first set of source tokens, wherein each one of the first set of source tokens is matched with the one of the first set of target tokens having the greatest measure of similarity with the one of the first set of source tokens.

8. The computer-implemented method of claim 4, wherein the first plurality of tokens is partitioned into the first set of target tokens and the first set of source tokens according to at least one partition factor, wherein the at least one partition factor is an integer having a value between two and ten inclusive, and wherein a number of the first set of target tokens equals a number of the first plurality of tokens divided by the at least one partition factor.

9. The computer-implemented method of claim 4, wherein partitioning the first plurality of tokens into at least the first set of target tokens and the first set of source tokens comprises:

defining a first region of each of the plurality of image frames;

selecting a first partition factor for the first region;

defining a second region of each of the plurality of image frames, wherein the second region includes a portion of each of the plurality of image frames other than the first region; and selecting a second partition factor for the second region, wherein the second partition factor is greater than the first partition factor, and wherein the first set of target tokens comprises tokens of the first region selected according to the first partition factor and tokens of the second region selected according to the second partition factor.

10. The computer-implemented method of claim 9, wherein the first region is a central region of each of the plurality of image frames, and wherein the second region is a boundary region of each of the plurality of image frames.

11. The computer-implemented method of claim 4, wherein partitioning the first plurality of tokens into at least the first set of target tokens and the first set of source tokens comprises:

calculating, for each one of the first plurality of tokens, a motion vector;

calculating, for each one of the first plurality of tokens, a sampling probability based at least in part on the motion vector calculated for the one of the first plurality of tokens and motion vectors calculated for each of the first plurality of tokens; and selecting tokens of the first plurality of tokens based at least in part on the sampling probabilities calculated for the first plurality of tokens.

12. The computer-implemented method of claim 4, wherein partitioning the first plurality of tokens into at least the first set of target tokens and the first set of source tokens comprises:

calculating, for each one of the first plurality of tokens, a saliency score;

calculating, for each one of the first plurality of tokens, a sampling probability based at least in part on the saliency score calculated for the one of the first plurality of tokens and saliency scores calculated for each of the first plurality of tokens; and selecting tokens of the first plurality of tokens based at least in part on the sampling probabilities calculated for the first plurality of tokens.

13. The computer-implemented method of claim 12, wherein the transformer model further comprises a saliency estimation module having a learnable matrix, and wherein the method further comprises:

determining a query matrix, a key matrix and a value matrix for a self-attention mechanism of the transformer model, and wherein the saliency score is calculated for each one of the first plurality of tokens based at least in part on the key matrix and the learnable matrix.

14. The computer-implemented method of claim 4, wherein classifying the video file based at least in part on the second plurality of tokens comprises:

generating a plurality of embeddings based at least in part on the second plurality of tokens, wherein each one of the plurality of embeddings is generated for one of the second plurality of tokens; and providing at least some of the plurality of embeddings as inputs to a classifier, wherein the video file is classified based at least in part on outputs received from the classifier in response to the inputs.

15. The computer-implemented method of claim 4, wherein the video file comprises one of a documentary film, an educational video, an entertainment video, an informational video or a promotional video.

16. The computer-implemented method of claim 4, wherein each of the plurality of image frames of the video file has dimensions of approximately two hundred fifty-six pixels by two hundred fifty-six pixels, and wherein each of the plurality of tokens has dimensions of approximately sixteen pixels by sixteen pixels.

17. A computer-implemented method comprising:

receiving a video file over one or more networks;

extracting a plurality of image frames from the video file;

dividing the plurality of image frames into a first plurality of tokens, wherein each one of the first plurality of tokens has common dimensions, and wherein the first plurality of tokens do not overlap;

selecting a first set of target tokens from the first plurality of tokens based at least in part on at least one of:

locations of each of the first plurality of tokens within the plurality of image frames;

motion of each of the first plurality of tokens within the plurality of image frames; or saliency of each of the first plurality of tokens within the plurality of image frames;

defining a first set of source tokens to include each of the first plurality of tokens other than the first set of target tokens;

matching each one of the first set of source tokens with one of the first set of target tokens;

defining a first plurality of groups of tokens, wherein each one of the first plurality of groups comprises one of the first set of target tokens and one of the first set of source tokens matched to the one of the first set of target tokens;

defining a second plurality of tokens, wherein each one of the second plurality of tokens is defined for one of the first plurality of groups of tokens; and classifying the video file based at least in part on the second plurality of tokens.

18. The computer-implemented method of claim 17, wherein the second plurality of tokens is defined by a first transformer block of a transformer model, and wherein classifying the video file based at least in part on the second plurality of tokens comprises:

selecting, by a second transformer block of the transformer model, a second set of target tokens from the second plurality of tokens based at least in part on at least one of:

locations of each of the second plurality of tokens within the plurality of image frames;

motion of each of the second plurality of tokens within the plurality of image frames; or saliency of each of the second plurality of tokens within the plurality of image frames;

defining, by the second transformer block, a second set of source tokens to include each of the second plurality of tokens other than the second set of target tokens;

matching, by the second transformer block, each one of the second set of source tokens with one of the second set of target tokens;

defining, by the second transformer block, a second plurality of groups of tokens, wherein each one of the second plurality of groups comprises one of the second set of target tokens and the second set of source tokens matched to the one of the second set of target tokens; and defining, by the second transformer block, a third plurality of tokens, wherein each one of the third plurality of tokens is defined for one of the second plurality of groups of tokens, wherein the video file is classified based at least in part on the third plurality of tokens.

19. The computer-implemented method of claim 17, wherein selecting the first set of target tokens comprises:

calculating, for each one of the first plurality of tokens, a sampling probability according to a SoftMax function, wherein the sampling probability is calculated at least in part on at least one of the motion of each of the first plurality of tokens or the saliency of each of the first plurality of tokens, wherein the first set of target tokens is selected based at least in part on the sampling probabilities calculated for the first plurality of tokens.

20. The computer-implemented method of claim 17, wherein matching each one of the first set of source tokens with one of the first set of target tokens comprises:

calculating, for each one of the first set of source tokens, cosine similarities between the one of the first set of source tokens and each one of the first set of target tokens; and determining, for each one of the first set of source tokens, the one of the first set of target tokens having a greatest cosine similarity with the one of the first set of source tokens, wherein each one of the first set of source tokens is matched with the one of the first set of target tokens having the greatest cosine similarity with the one of the first set of source tokens, and wherein defining the second plurality of tokens comprises:

calculating, for each one of the first plurality of groups of tokens, one of the second plurality of tokens by an average pooling technique based on one of the first set of target tokens and the ones of the first set of source tokens matched with the one of the first set of target tokens.

* * * * *